Sept. 26, 1950  F. H. MUELLER ET AL  2,523,585
ADAPTER FOR CONNECTING SERVICE FITTINGS TO DRILLING MACHINES
Filed March 7, 1949  2 Sheets-Sheet 1

INVENTORS
Frank H. Mueller &
John J. Smith.
BY
Cushman Darby Cushman
Attorneys

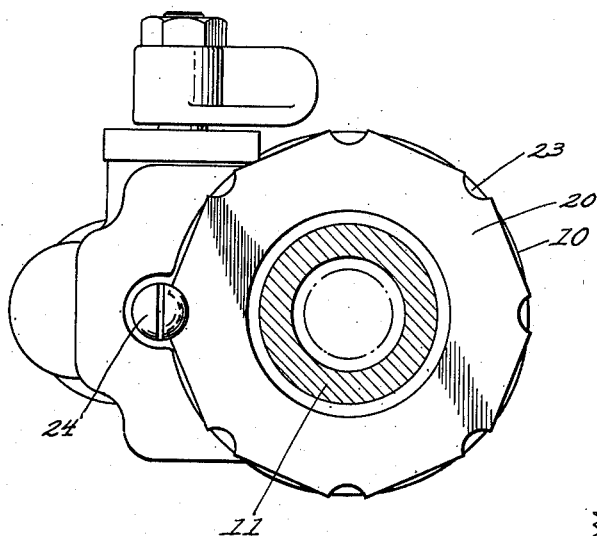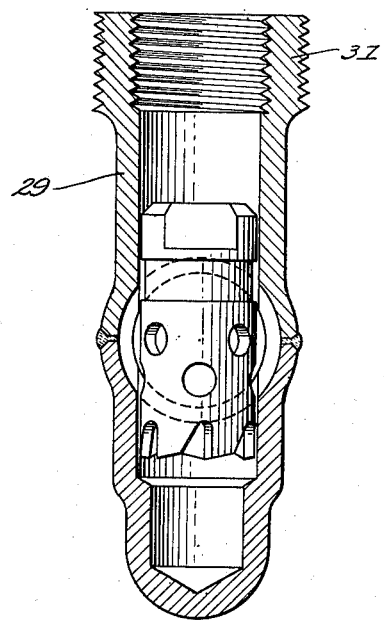
INVENTORS
Frank H. Mueller &
John J. Smith.
BY
Attorneys

Patented Sept. 26, 1950

2,523,585

UNITED STATES PATENT OFFICE 2,523,585

ADAPTER FOR CONNECTING SERVICE FITTINGS TO DRILLING MACHINES

Frank H. Mueller and John J. Smith, Decatur, Ill., assignors to Mueller Co., Decatur, Ill., a corporation of Illinois Application March 7, 1949, Serial No. 79,943

1 Claim. (Cl. 285—108)

1

The present invention relates to adapters and, more particularly, to an improved adapter assembly for connecting service T's, branch connectors and line stopper fittings of various sizes to drilling machines or the like, such as disclosed in our copending application Serial No. 79,942 filed March 7, 1949.

An important object consists in providing adapters of various sizes for connecting service T's and line stoppers to a drilling machine, and associating with the adapter means for releasably locking the same against rotative movement when being threaded on a branch connector or line stopper fitting after the fitting has been welded or otherwise connected to the main or service pipe. The different size adapters are constructed and arranged to provide simple, efficient and economical means whereby one drilling machine may be conveniently used for tapping a main through a service T mounted thereon, and for inserting plugs in the T and line stopper fittings, and also for expanding rubber stoppers in line stopper fittings and branch connectors of various sizes.

A further object consists in forming an adapter with a flange at one end having spaced notches around the outer edge of the flange for receiving a retaining member in order to lock the adapter in a fixed position. The adapters, which are various sizes, are externally threaded for connecting the same to a machine or valve body. The adapters are also internally threaded and are of different internal diameters so as to be conveniently connected to different size service T's or line stopper fittings with which the adapter is to be used.

Other objects and advantages of the invention will become apparent from the following description when taken in conjunction with the accompanying claims and drawings.

Referring to the drawings in which is shown a preferred embodiment of the invention:

Figure 4 is a longitudinal sectional view taken substantially along the line 4—4 of Figure 1, looking in the direction of the arrows, and Figure 5 is a detailed sectional view of a line stopper fitting which may readily be connected to the machine body by one of the adapters.

2

Figure 1:
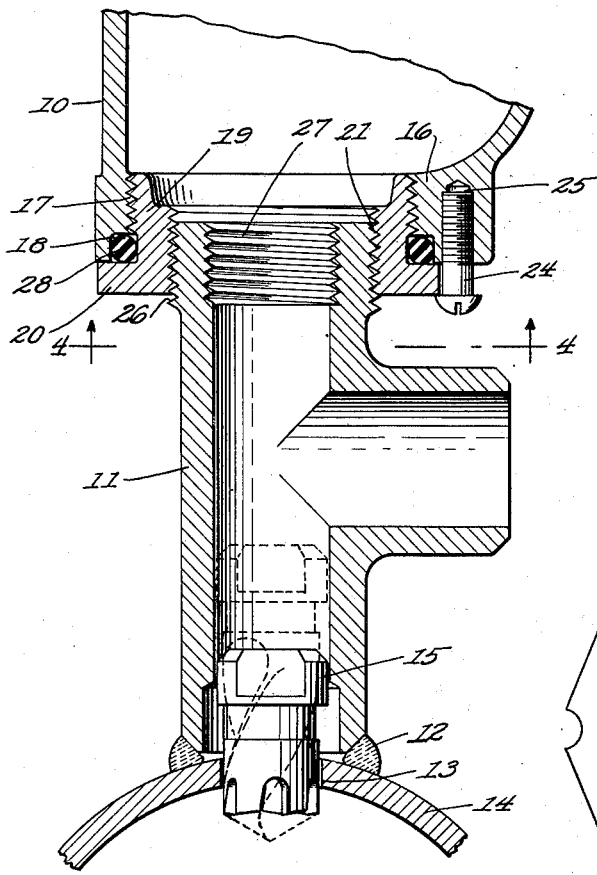
Figure 1 is a detailed vertical sectional view of the lower portion of a drilling machine body connected to a fitting mounted on the service main, by our improved form of adapter.

Referring to the drawings and, more particularly, Figure 1, 10 indicates the lower end portion of the body of a drilling machine or the like such as disclosed in our copending application Serial No. 79,942.

A service T or branch connection 11 is welded or otherwise connected at its lower end as at 12 at the point adjacent where the lateral opening 13 is to be formed in the main or service line 14 by the cutter 15 which is detachably connected at its upper end to the boring bar or other tool, not shown, that extends axially through the T fitting and the body 10, so as to be operated in substantially the same manner as the boring bar in our said copending application Serial No. 79,942.

Figure 3:
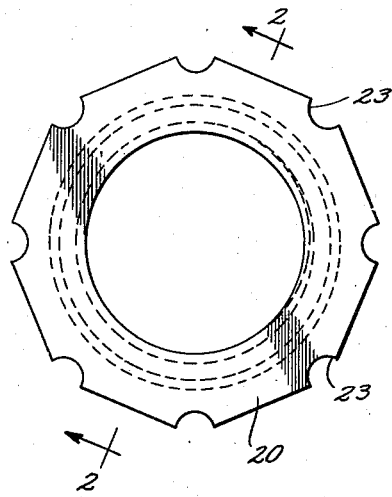
Figure 3 is a detailed plan view of the adapter.
Figure 2:
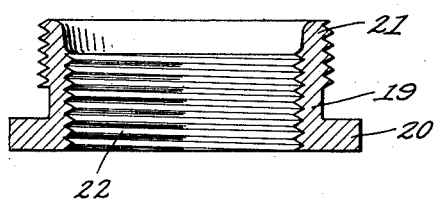
Figure 2 is a sectional view taken substantially along the line 2—2 of Figure 3.

The bottom or lower wall 16 of the body 10 is provided with an internally threaded opening 17 and has at its outer end an annular recess 18. In order to connect service T's and line stopper fittings of various sizes to the body 10 of the drilling machine, there is provided a new and improved form of adapter 19 which has at its lower end an outwardly extending radial flange 20. The adapter is formed with an externally threaded portion 21 positioned above the flange 20 (Fig. 2). The external size and shape of the adapters and their externally threaded portions 21 may be the same, but each adapter is formed with an internally threaded portion 22 which varies in size and diameter so as to correspond to the particular size of service T or stopper fitting with which the adapter is to be used. The flange 20 of each adapter has a plurality of preferably uniformly spaced notches or recesses 23 (Fig. 3) extending around the outer edge or perimeter of the flange for releasably receiving a threaded bolt or screw 24 that is arranged to be detachably connected to the wall of a complementary threaded opening 25 in the bottom 16 of the body 10, so that when one of the notches 23 registers with the opening 25 and the bolt 24 is threaded into the opening, it will provide releasable retaining means for preventing rotation of the adapter.

The upper end portion of the service T 11 is externally threaded as at 26 so as to be connected to the internally threaded portion 22 of the adapter when the parts are set up. The T 11 may also be internally threaded at its upper end as at 27 for receiving a closure plug or the like when the body 10 and its associated parts are removed. An O-ring packing or the like 28 is positioned in the recess 18 of the body 10 to provide a tight seal between the adapter 19 and the valve body when the parts are assembled, and is retained in position by the annular flange 20 that is disposed adjacent the lower end or bottom 16 of the machine body 10.

Figure 5 shows a line stopper fitting 29 which may be used for small pipe line stoppers with which the drilling machine is associated, and is externally threaded at its upper end as at 31 so as to be connected to a machine body 10 or the like (Fig. 1) by an adapter 19 having the desired internally threaded diameter for engaging the threads 31 of the stopper, in order to firmly and securely connect the stopper to the body 10 of the machine.

It will be seen, by reason of the novel construction and arrangement of the adapter assembly, that one valve body 10, one O-ring packing 28 and one retaining bolt 24 may be associated with several adapters having various sizes of inside threads 22 so as to receive various sizes of T's and line stopper fittings. Moreover, the rotation of the proper size adapter 19, associated with the body 10, may be arrested or stopped at a point where one of the notches 23 in the flange 20 registers with the opening 25, so that upon connecting the bolt 24 to the opening 25, the engagement of the bolt with the aligned notch 23 will maintain the adapter in a fixed non-rotatable position in order that the upper externally threaded portion of the T fitting 11 or line stopper fitting 29 may be connected to the internal threads of the adapter, after the fitting has been welded or otherwise secured to the main 14. The O-ring packing is automatically forced into sealing engagement with the adapter by the fluid pressure so that it is not necessary that the flange 20 of the adapter abut the end of the valve body when the parts are assembled.

It will be understood that the form of the invention shown is subject to modifications such as fall within the scope of the following claim.

We claim:

In combination with a drilling machine body, a fitting arranged to be connected to said body, the lower end of said body having a threaded opening, an adapter having an externally threaded portion engaging said threaded opening, said adapter having an internally threaded portion, said fitting having an externally threaded portion connected to the internal threads on said adapter, the threaded opening in said body having an annular recess in the outer end thereof, a packing in said recess, said adapter having an outwardly extending radial flange overlapping the lower end of said body and said annular recess so as to retain the packing in the recess when the parts are assembled, means arranged to lock the adapter against rotary movement when threaded on the fitting, and said packing providing a seal between the adapter and the body when the parts are set up.

FRANK H. MUELLER.
JOHN J. SMITH.

REFERENCES CITED

The following references are of record in the file of this patent:

UNITED STATES PATENTS

| Number | Name | Date |
|---|---|---|
| 200,471 | Northrup | Feb. 19, 1878 |
| 997,464 | Metcalf | July 11, 1911 |
| 1,138,946 | Elliott | May 11, 1915 |
| 1,365,151 | Burke | Jan. 11, 1921 |
| 1,519,110 | Brownell | Dec. 16, 1924 |
| 1,701,786 | McMurray | Feb. 12, 1929 |
| 2,314,012 | Mueller | Mar. 16, 1943 |
| 2,413,878 | Maky | Jan. 7, 1947 |